H. S. THOMAS & C. H. McFARLING.
HEADER.
APPLICATION FILED DEC. 7, 1912.
1,090,802.
Patented Mar. 17, 1914.
3 SHEETS—SHEET 3.
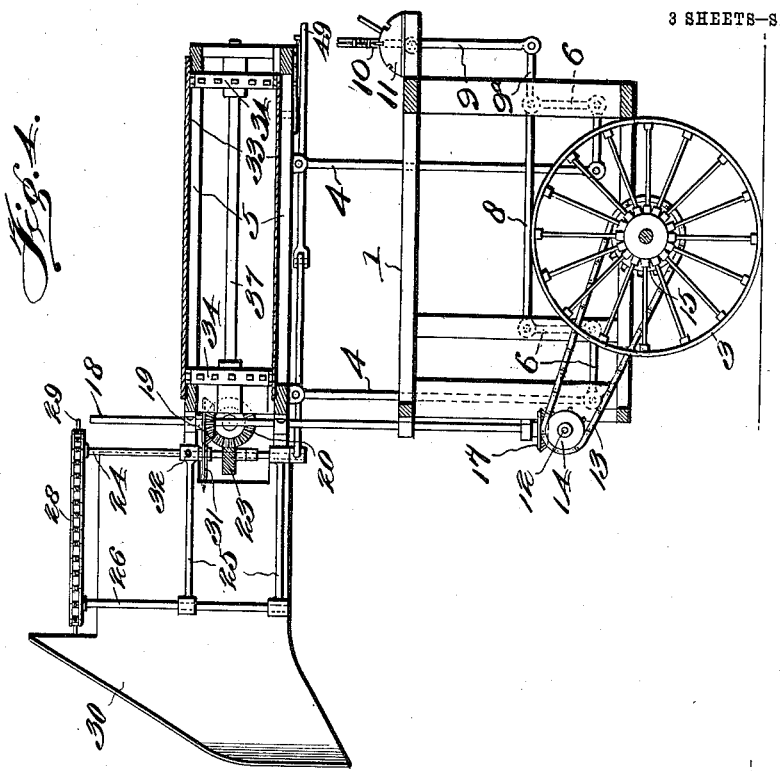
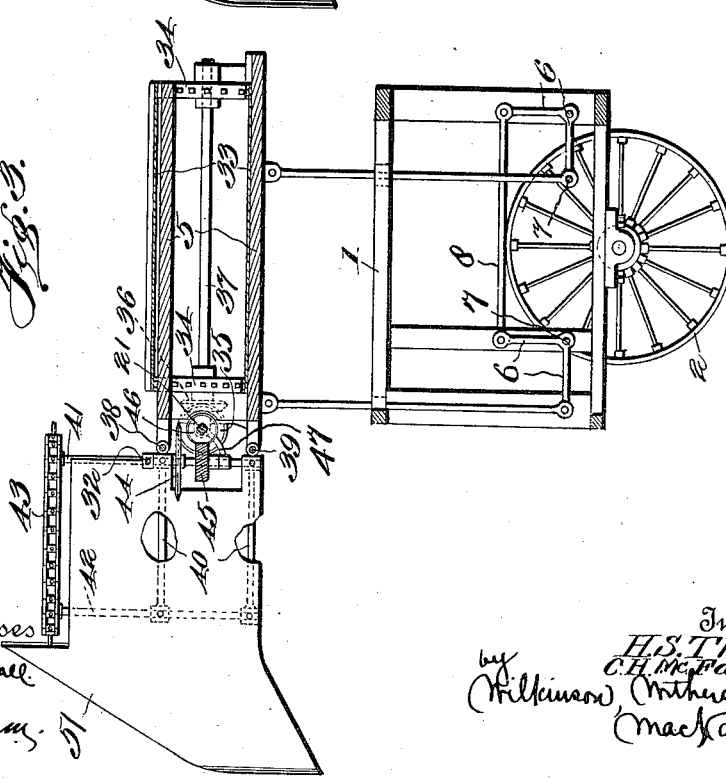
Witnesses
Inventors
H. S. Thomas,
C. H. McFarling,
by Wilkinson Witherspoon &
MacKaye
Attorneys

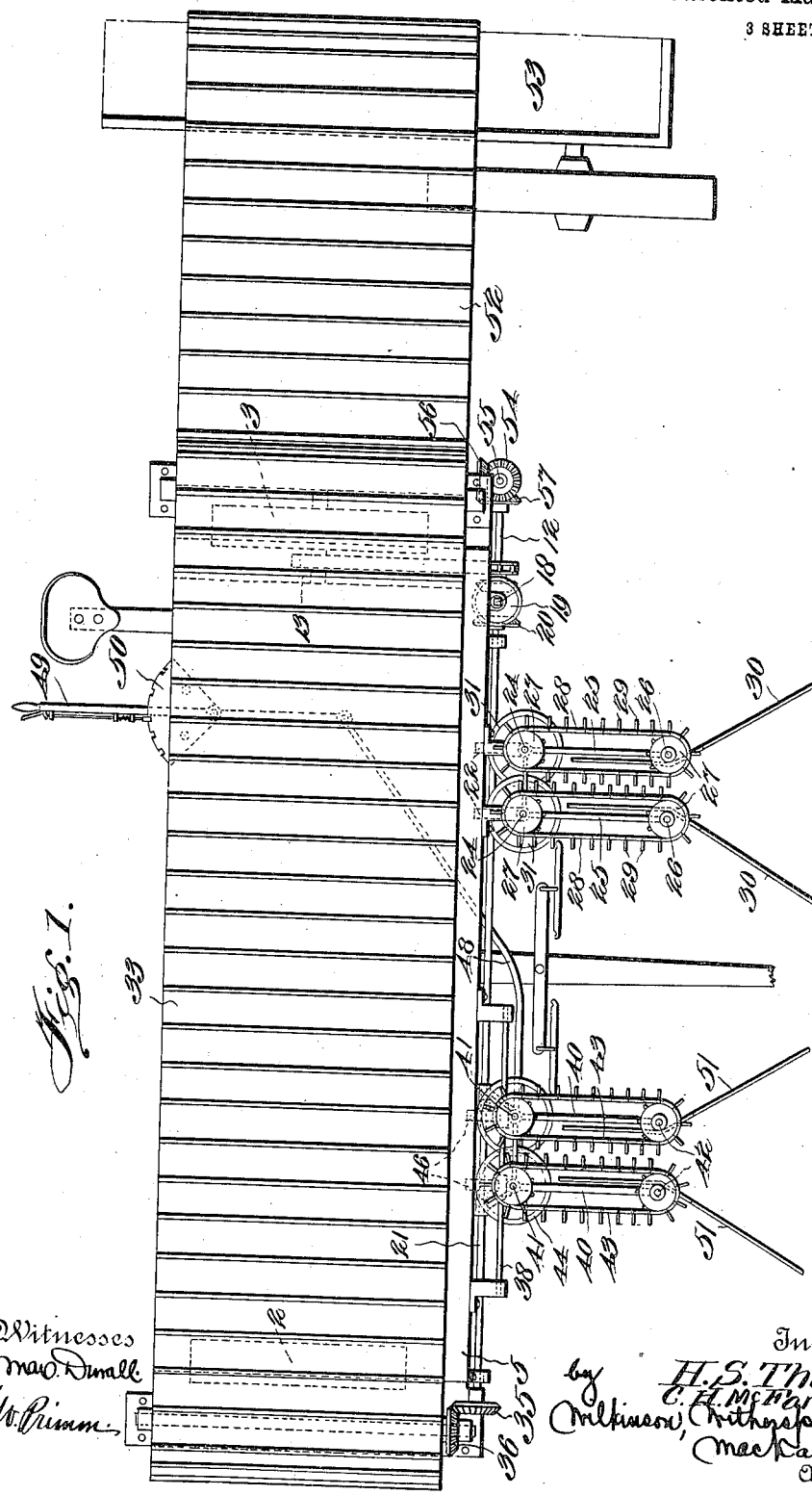

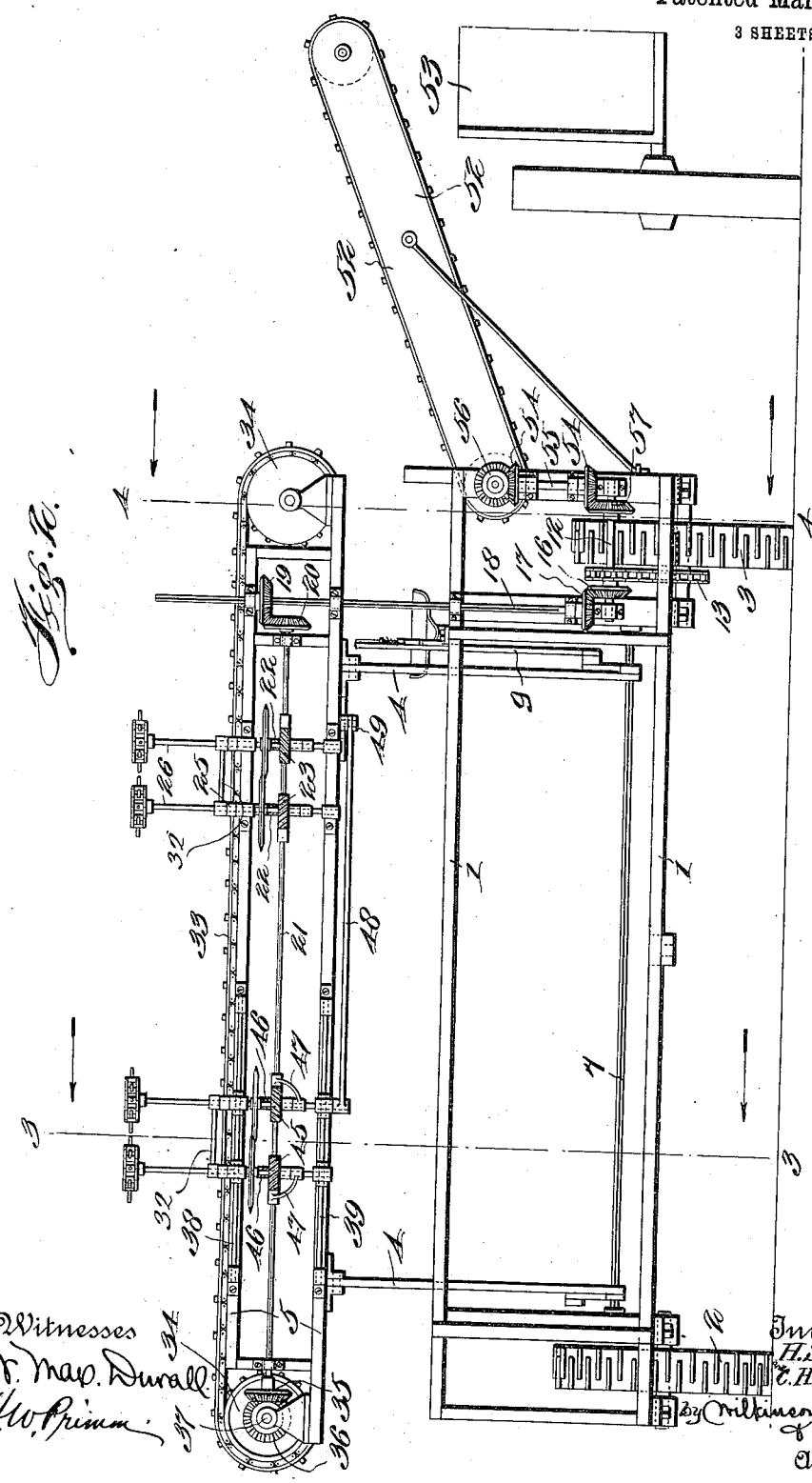

UNITED STATES PATENT OFFICE.

HENRY S. THOMAS AND CHARLES H. McFARLING, OF FARGO, OKLAHOMA.

HEADER.

1,090,802.  Specification of Letters Patent.  Patented Mar. 17, 1914.

Application filed December 7, 1912. Serial No. 735,504.

*To all whom it may concern:*

Be it known that we, HENRY S. THOMAS and CHARLES H. McFARLING, citizens of the United States, residing at Fargo, in the county of Ellis and State of Oklahoma, have invented certain new and useful Improvements in Headers; and we do hereby declare the following to be a full, clear, and exact description of the invention, such as will enable others skilled in the art to which it appertains to make and use the same.

Our invention relates to improvements in headers, and it consists in the constructions, combinations and arrangements herein described and claimed.

An object of our invention is to provide an improved header for kafir, cane, maize, and other plants, which will have a maximum capacity and act with certainty under all practical conditions.

A further object of our invention is to provide an improved header, which can be readily adapted to accommodate varying spacing between the plant rows and all different character and height of the plants.

In the accompanying drawings forming a part of this application, and in which similar reference symbols indicate corresponding parts in the several views:—Figure 1 is a plan view, illustrating one embodiment of our invention; Fig. 2 is a front elevation of the construction shown in Fig. 1, with the diverging gathering plates omitted; Fig. 3 is a section on the line 3—3 of Fig. 2; Fig. 4 is a section on the line 4—4 of Fig. 2.

Referring to the drawings, 1 indicates the body of a vehicle supported on ground wheels 2, 3, and carrying vertically adjustable supports 4 for a frame 5. The supports 4 are pivoted to bell-cranks 6, which latter are secured to shafts 7 and connected by links 8; a lever 9 being connected by a link 9ª to one of said bell-crank levers, and provided with a latch 10 for engaging a fixed notched segment 11, to shift the vertically adjustable frame 5 and lock the latter in its several adjusted positions.

A countershaft 12 is driven by a sprocket chain 13 engaging sprocket wheels 14 and 15 on said shaft and the axle of the ground wheel 3, respectively; said shaft 12 carrying a bevel gear 16 in mesh with a similar gear 17 on a vertical square shaft 18. The shaft 18 extends slidably through a bevel gear 19 journaled on the vertically shiftable frame 5 in mesh with a similar gear 20 secured to a horizontal square shaft 21 on said frame. A pair of skew gears 22 are secured on said horizontal shaft 21 in mesh with similar gears 23 on vertical spindles 24 journaled in spaced members 25 rigidly secured to the frame 5; corresponding spindles 26 being journaled in the forward ends of said frame members 25. The upper ends of said spindles 24 and 26 carry sprocket wheels 27 engaging a pair of endless sprocket chains 28; said endless chains being provided with coöperating projecting lugs 29 for positively feeding plants directed between said chains by diverging gathering members 30 mounted on the frame members 25.

A pair of disk cutters 31 are secured to the spindles 24 for severing the heads from the plant stalks, and a tripping rod 32 is carried by the frame 5 in position to engage the severed plant heads during their final feed by the chains 28, to cause said heads to be deposited transversely across a horizontal endless carrier 33 mounted on sprocket wheels 34 on the frame 5; said endless carrier being driven by bevel gears 35 and 36 secured, respectively, to the horizontal shaft 21 and the spindle 37 of said sprocket wheels 34.

The frame 5 is provided with parallel upper and lower guides 38 and 39 on which is slidably mounted a rigid auxiliary frame 40 comprising upper and lower members, in which are journaled two pairs of spindles 41 and 42; said spindles carrying endless feed chains 43, disk cutters 44, and skew gears 45 similar to the chains 28, cutters 31 and the gears 23 previously described. The frame 40 also carries diverging gathering members 51 similar to the previously described gathering members 30. Skew gears 46 are slidably mounted on the horizontal square shaft 21 and journaled in brackets 47 on the sliding frame 40 in mesh with said gears 45; thereby causing said gears 45 and 46 to remain in mesh upon shifting of the frame 40 on its guides 38 and 39. The frame 40 is connected by a link 48 to a lever 49 provided with a spring latch for engaging a notched segment 50 rigidly secured to the frame 5, thereby providing convenient means for horizontally shifting the frame 40 to vary the space between the gathering members 51 and 30, in order to adjust the machine to the varying spacing between adjacent rows of plants.

From the above description, it will be clear that our invention provides an improved header, in which the frame 5 can be readily adjusted vertically to suit the height and character of the plants, and the frame 40 adjusted horizontally to adapt the machine for the varying spacing between adjacent plant rows.

An endless elevator 52 is carried by the vehicle bed 1 for receiving the severed heads from the horizontal carrier 33 and delivering said heads in orderly arrangement to a vehicle 53, or other desired point; said elevator being driven by bevel gears 54 on a vertical shaft 55 in mesh with similar gears 56 and 57 on said elevator and the countershaft 12, respectively.

We have illustrated and described preferred and satisfactory constructions, but changes could be made within the spirit and scope of our invention.

We claim:—

In a header, the combination of a vehicle body, traction wheels therefor, a main frame carried by said body, means for vertically adjusting said main frame, an endless conveyer mounted rearwardly on said main frame, a pair of coöperating cutter disks journaled on said main frame in front of said conveyer, a square line shaft journaled on said main frame, drive connections between said line shaft and said conveyer and disk cutters, an auxiliary frame slidably mounted on said main frame, a pair of vertical spindles journaled on said slidably mounted frame, coöperating cutter disks carried by said vertical spindles, gears secured on said spindles, gears journaled on said slidably mounted frame in mesh with said spindle gears and provided with square axial bores slidably engaging said square line shaft, means for shifting said slidably mounted frame on said main frame, a gear secured on said line shaft, a drive gear journaled on said main frame in mesh with said shaft gear and provided with a square axial bore, a vertical shaft journaled on said vehicle body and provided with a square portion extending slidably through the bore of said drive gear, and drive connections on said vehicle body between said traction wheels and vertical shaft.

In testimony whereof we affix our signatures in presence of two witnesses.

HENRY S. THOMAS.
CHARLES H. McFARLING.

Witnesses:
O. J. THOMAS,
J. H. THOMAS.

---

Copies of this patent may be obtained for five cents each, by addressing the "Commissioner of Patents, Washington, D. C."